(12) United States Patent
Wai et al.

(10) Patent No.: US 12,352,120 B2
(45) Date of Patent: Jul. 8, 2025

(54) ELASTOMER MOLDED WHEEL FOR DOWNHOLE TRACTOR

(71) Applicant: Halliburton Energy Services, Inc., Houston, TX (US)

(72) Inventors: Simon Whye Kwong Wai, Jalan Ahmad Ibrahim (SG); Wesley Neil Ludwig, Fort Worth, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 6 days.

(21) Appl. No.: 17/628,530

(22) PCT Filed: Aug. 16, 2019

(86) PCT No.: PCT/US2019/046930
§ 371 (c)(1),
(2) Date: Jan. 19, 2022

(87) PCT Pub. No.: WO2020/041147
PCT Pub. Date: Feb. 27, 2020

(65) Prior Publication Data
US 2022/0259933 A1 Aug. 18, 2022

(51) Int. Cl.
*E21B 23/00* (2006.01)
*B60C 7/00* (2006.01)

(52) U.S. Cl.
CPC .............. *E21B 23/001* (2020.05); *B60C 7/00* (2013.01)

(58) Field of Classification Search
CPC ................................ E21B 23/001; B60C 7/00
See application file for complete search history.

(56) References Cited

U.S. PATENT DOCUMENTS 2,104,532 A * 1/1938 Sommer ............. B60C 11/0311
152/DIG. 3
5,264,640 A * 11/1993 Platz ......................... C07C 4/22
264/912

(Continued)

FOREIGN PATENT DOCUMENTS

DK 201570284 A1 * 5/2015 ............... E21B 4/18
WO 2017093957 A1 6/2017

OTHER PUBLICATIONS

International Search Report issued in related PCT/US2019/046930, dated Dec. 4, 2019.

*Primary Examiner* — D. Andrews
(74) *Attorney, Agent, or Firm* — The Hilton Firm PLLC

(57) ABSTRACT

Provided are compositions, methods, and systems that relate to downhole tractor wheels. A downhole tractor system comprising: tubular housing capable of being deployed downhole by wireline; plurality of wheels rotatably mounted to tubular housing, wheels having at least a portion of an outer surface comprising polymeric material. A method for conveying a downhole tool along an inner wall of a wellbore, the method comprising: disposing downhole tool coupled to downhole tractor within wellbore; providing energy to downhole tractor by way of wireline thereby rotating a wheel disposed on downhole tractor; frictionally engaging the inner wall of wellbore with wheel comprising polymeric material disposed on at least a portion of an outer surface of wheel thereby providing a compressive load between the inner wall of the wellbore and polymeric material; allowing downhole tractor to proceed along wellbore wall until downhole tractor reaches desired location; deploying downhole tool for use in wellbore.

16 Claims, 3 Drawing Sheets

(56) References Cited

U.S. PATENT DOCUMENTS

| | | | |
|---|---|---|---|
| 6,273,189 B1 | 8/2001 | Gissler et al. | |
| 9,157,287 B2* | 10/2015 | Slocum | E21B 4/18 |
| 2005/0217867 A1 | 10/2005 | Misselbrook | |
| 2011/0258886 A1* | 10/2011 | Moon | A43B 13/22 |
| | | | 12/146 B |
| 2012/0074762 A1* | 3/2012 | Pope | B60B 11/06 |
| | | | 301/36.1 |
| 2012/0223167 A1* | 9/2012 | Butler | B02C 25/00 |
| | | | 241/33 |
| 2013/0240272 A1* | 9/2013 | Gass | B60C 7/105 |
| | | | 152/1 |
| 2014/0014368 A1 | 1/2014 | Hallundbæk | |
| 2014/0174760 A1 | 6/2014 | Slocum et al. | |
| 2014/0250627 A1* | 9/2014 | McKay | B60B 1/006 |
| | | | 16/45 |

* cited by examiner

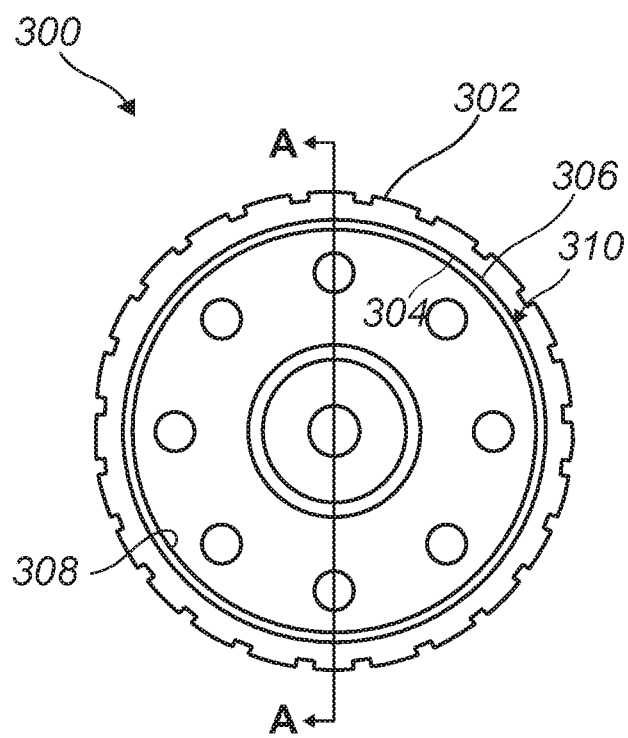
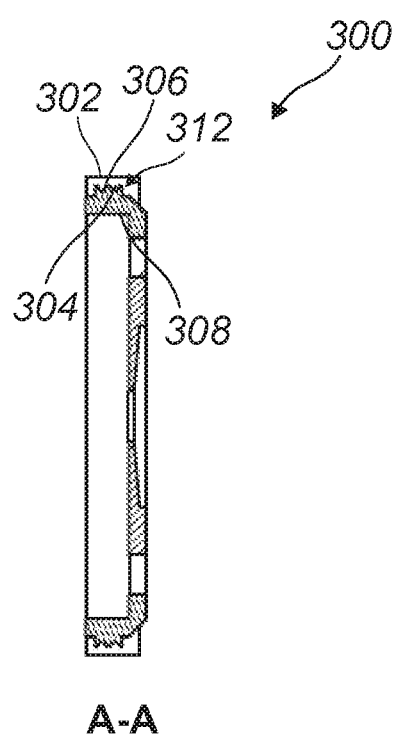
FIG. 3A  FIG. 3B
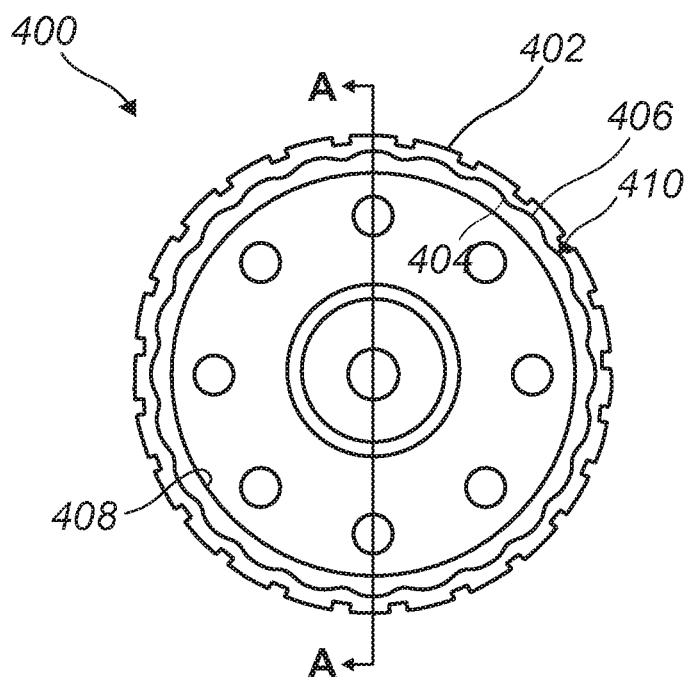
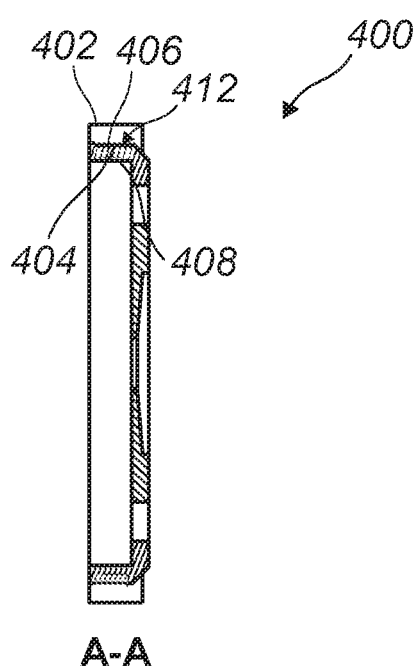
FIG. 4A  FIG. 4B

ELASTOMER MOLDED WHEEL FOR DOWNHOLE TRACTOR

BACKGROUND

Downhole propulsion machines, often referred to as "tractors," may be used to facilitate the conveyance of wireline assemblies and coiled tubing strings into a wellbore. Such tractors may engage the inner walls of the casing, string or open hole, as the case may be, to propel the tractor and any portions of pipe or tubing or tools connected thereto.

BRIEF DESCRIPTION OF THE DRAWINGS

These drawings illustrate certain aspects of some of the present disclosure, and should not be used to limit or define the disclosure.

FIGS. 3a and 3b illustrate an embodiment of a wheel.

FIGS. 4a and 4b illustrate an embodiment of a wheel.

DETAILED DESCRIPTION

Figure 1:
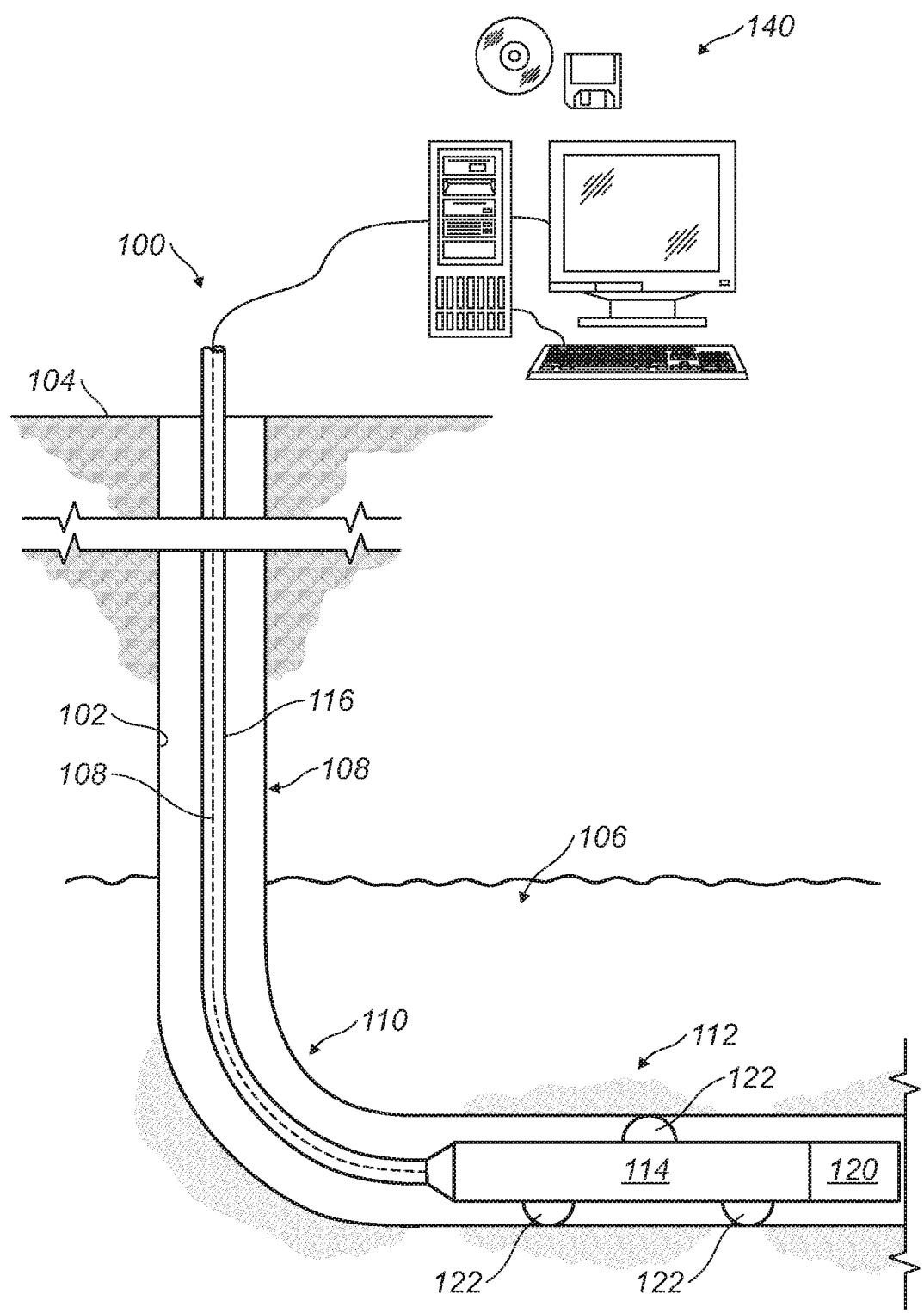
FIG. 1 illustrates a wellbore system comprising a downhole tractor.

The present disclosure may be directed to systems and methods for conveying equipment along a surrounding tubular structure, such as a wellbore. The system and methods disclosed herein may be designed to utilize a tractor or tractors to convey equipment along the interior of a tubular structure by engaging the surrounding wall of the tubular structure. The tractor may comprise a wheel or a plurality of wheels which may be oriented to grip the surrounding wall and to establish a tangential force which may be used to facilitate movement of equipment along the interior of the tubular structure. The present disclosure may provide traction by way of polymeric material-to-metal contact. This may be advantageous as it may provide more traction than the currently used methods which utilize metal-to-metal contact. This increased traction may provide the tractor with more force to overcome obstacles, carry higher payloads, and/or successfully travel longer distances to convey tools in a well. The present disclosure may also be advantageous as it may minimize damage to the casing and/or wall of the wellbore. In certain embodiments, damage to the casing caused by the present disclosure may be about 0.001% or less. In wellbore applications, the tractor may be employed to convey equipment along an open wellbore, along the interior of a casing, and/or along the interior of another tubular structure.

The wheel may be of any suitable shape or size capable for use in a given application and should not be limited herein. In certain embodiments, the wheel may comprise an outer diameter of about 2 inches (about 50 mm) to about 3.5 inches (about 90 mm), or about 2 inches (about 50 mm) to about 3 inches (about 75 mm), or about 3 inches (about 75 mm) to about 3.5 inches (about 90 mm), and/or any value or range of values therein. The wheel may be of any suitable width for a given application. Suitable wheel widths may include, but are not limited to, about 0.125 inches (about 3 mm) to about 0.75 inches (about 19 mm), or about 0.125 inches (about 3 mm) to about 0.5 inches (about 13 mm), or about 0.5 inches (about 13 mm) to about 0.75 inches (about 19 mm), and/or any value or value of ranges therein. The wheel may comprise a substrate and tread.

Any suitable substrate capable of withstanding downhole temperatures and pressure may be used and the disclosed apparatus is not limited to any particular material for the substrate. In certain embodiments, the substrate may comprise a metal, a metal alloy, the like, or any combination of these materials. As used herein, the term "metal alloy" may refer to a mixture of two or more elements, wherein at least one of the elements is a metal. The metal or metal alloy may be selected from the group consisting of beryllium, aluminum, tin, titanium, vanadium, chromium, manganese, iron, cobalt, nickel, copper, tantalum, tungsten, graphite, carbon, silicon, boron nitride, magnesium, rare earth elements, oxides of any of the foregoing, derivatives thereof, the like, or any combinations of these materials.

The substrate may be of any suitable size and shape for a given application and should not be limited. In certain embodiments, the substrate may comprise a diameter or width of about 2 inches (about 50 mm) to about 4 inches (about 100 mm), or about 2 inches (about 50 mm) to about 3 inches (about 75 mm), or about 3 inches (about 75 mm) to about 4 inches (about 100 mm), and/or any value or range of values therein. Suitable shapes may include, but are not limited to, circles, ovals, the like, or other shapes suitable for use with a wheel. In certain embodiments, the outer surface of the substrate may be smooth. Optionally, the outer surface of the substrate may be non-smooth with ridges and valleys. In certain embodiments, a non-smooth outer surface of the substrate may enhance bonding between the tread and the substrate by way of providing more surface area at the substrate tread interface. The outer surface may be treated so as to aid in the bonding of the tread to the outer surface. Treatments may include, but are not limited to, sand blasting, machining, laser texturing, chemical etching, or other processes that may be used to roughen the outer surface.

The wheel may further comprise tread. Tread may comprise any suitable material capable of minimizing damage to the wellbore wall while providing sufficient traction. In certain embodiments, tread may be formed of any suitable polymeric material including, but not limited to, elastomers, thermoplastic elastomers, cast elastomers, thermoplastics, rubbers, thermoset rubbers, silicone, epoxies, resins, foam rubber, urethane foam, plastic foam, vulcanized elastomers, vulcanized rubbers, the like, or any combination of these materials.

Examples of suitable polymeric material may include, but are not limited to, a polyurethane rubber, cast polyurethanes, thermoplastic polyurethanes, polyethane polyurethanes, a polyester-based polyurethane rubber, lactone polyester-based thermoplastic polyurethanes, a polyether-based polyurethane rubber, a thiol-based polymer, 1,3,5,-triacryloyl-hexahydro-1,3,5-triazine), a thiol-epoxy polymer, having an epoxide functional group, such as bisphenol-A diglycidyl ether, triglycidylisocyanurate, trimethylolpropane triglycidyl ether, a hyaluronic acid rubber a polyhydroxobutyrate rubber, a polyester elastomer, a polyester amide elastomer, a starch-based resin, starch-poly(ethylene-co-vinyl alcohol), a starch-polyvinyl alcohol, a starch-polylactic acid, starch-polycaprolactone, starch-poly(butylene succinate), a polyethylene terephtha late polymer, a polyester thermoplastic, polyether/ester copolymers, polyester/ester copolymers, a polylactic acid polymer, a polybutylene succinate polymer, a polyhydroxy alkanoic acid polymer, a polybutylene terephthalate polymer, a polysaccharide, chitin, chitosan, a protein; an aliphatic polyester, poly($\varepsilon$-caprolactone), a poly(hydroxybutyrate), poly(ethyleneoxide), poly(phenyllactide), a poly(amino acid), a poly(orthoester), polyphosphazene, a polylactide, a polyglycolide, a poly(anhydride), poly(adipic anhydride), poly(suberic anhydride), poly(sebacic anhydride), poly(dodecanedioic anhydride), poly(maleic anhydride), and poly(benzoic anhydride), a polyepichlorohydrin, a copolymer of ethylene oxide/polyepichlorohydrin, a terpolymer of epichlorohydrin/ethylene oxide/allyl glycidyl ether, nitrile butadiene (NBR), acrylonitrile, organosiloxoane elastomer, butadiene, carboxylated acrylonitrile butadiene (XNBR), hydrogenated acrylonitrile butadiene (HNBR), carboxylated hydrogenated acrylonitrile butadiene (XHNBR), hydrogenated carboxylated acrylonitrile butadiene (HXNBR), ethylene propylene (EPR), ethylene propylene diene (EPDM), tetrafluoroethylene and propylene (FEPM), fluorocarbon (FKM), perfluoroelastomer (FEKM), polphenylene sulfide (PPS), polyetheretherketones such as (PEEK), (PEK) and (PEKK), polytetrafluoroethylene (PTFE), copolymers thereof, terpolymers thereof, derivatives thereof, or any combinations of these materials.

Several parameters and characteristics may be considered when selecting the appropriate tread material for a given application. In some embodiments, tread material for a given application may be selected based on at least one of the following characteristics: operating temperature, durometer, compression set, elongation, tensile strength, friction coefficient, wear inhibition, corrosion resistance, or any combinations of these characteristics.

The operating temperature of a material may refer to the maximum temperature that a material may reach before failure. The operating temperature necessary for tread material may depend on the environment in which the wheel may be disposed. Operating temperatures for tread material may reach, in some scenarios, about 35° F. (about 2° C.) to about 350° F. (about 177° C.), or about 35° F. (about 2° C.) to about 200° F. (about 93° C.), or about 200° F. (about 93° C.) to about 350° F. (about 177° C.), or any value or range of values therein. Any material operable at these temperatures may be used.

Shore A hardness, as used herein, may refer to the hardness of the tread. Shore A hardness of the tread material may be determined using a durometer according to ASTM D2240-15, *Standard Test Method for Rubber Property-Durometer Hardness*, ASTM International, West Conshohocken, PA 2015. ASTM D2240-16 may measure the depth of an indentation in a material that may be created by a given force on a standardized presser foot. This depth may be dependent on the hardness of the material, its viscoelastic properties, the shape of the presser foot, and the duration of the test. A higher Shore A hardness number may indicate harder material (i.e. high resistance to indentation). A lower Shore A hardness number may indicate the material is soft (i.e. less resistance to indentation). In certain embodiments, a high Shore A hardness number may be desired. Any material with a Shore A hardness number capable of resisting indentation at operating conditions downhole may be used. Suitable Shore A hardness numbers may include, but are not limited to, about 90 or greater, or about 90 to about 95, or about 90 to about 92, or about 92 to about 95, or any suitable value or range of values therein. Any tread material with a Shore A hardness number may be used and should not be limited.

Compression set, as used herein, may refer to the ability of a material to recover and resist permanent deformation after undergoing prolonged compressive stresses at a given temperature and deflection. Compression set of the tread may be determined according to ASTM D395-18, *Standard Test Method for Rubber Property-Compression Set*, ASTM International, West Conshohocken, PA 2016. The tread may have a compression set of about 0.0001% to about 10%, or about 0.0001% to about 5%, or about 5% to about 10%, or any value or range of values therein. The thickness of the tread may directly affect its compression set. The tread material may be selected to have a compression set capable of resisting permanent deformation after undergoing prolonged compressive stress produced by a downhole environment for a given application and should not be limited.

Tensile strength, as used herein, may refer to the tread material's resistance to rupture under tension. Tensile strength may be expressed as its measured strength at the break. Any tread with a tensile strength capable of withstanding downhole conditions may be used. Tensile strengths may include, but are not limited to, about 4,000 psi (about 27,600 kPa) or greater. In certain embodiments, the tread material may have a tensile strength of about 550 psi (about 3,800 kPa) to about 4,500 psi (about 31,600 kPa), or about 550 psi (about 3,800 kPa) to about 2,900 psi to about 4,000 psi (about 27,600 kPa), or about 4,000 psi (about 27,600 kPa) to about 4,500 psi (about 31,600 kPa), or about 4,500 psi (about 31,600 kPa) or greater, or any value or range of values therein. Tensile strength may be tested according to ASTM D412-16, *Standard Test Methods for Vulcanized Rubber and Thermoplastic Elastomers-Tension*, ASTM International, West Conshohocken, PA 2016. The tread material may be selected to have any tensile strength for a given downhole application and should not be limited.

Ultimate elongation, as used herein, may refer to the tread material's ability to stretch without breaking. Ultimate elongation of the tread material may be expressed as percent of original length at the moment of breaking. Ultimate elongation of the tread may be determined according to ASTM D412-16, *Standard Test Methods for Vulcanized Rubber and Thermoplastic Elastomers-Tension*, ASTM International, West Conshohocken, PA 2016. In certain embodiments, suitable ultimate elongation of tread material may include, but is not limited to, about 150% to about 450%, or about 150% to about 325%, or about 325% to about 450%, or any value or range of values therein. The tread material may be selected to have any ultimate elongation for a given downhole application and should not be limited.

Coefficient of friction, as used herein, may refer to the ratio of the frictional force to the normal force between a dry substrate and dry tread. In certain embodiments, the tread material may comprise a coefficient of friction of about 0.3 to about 0.9, or about 0.4 to about 0.8, or about 0.5 to about 0.7, or any value or range of values therein. In certain embodiments, a higher coefficient of friction may be desirable. The tread material may be selected to have any coefficient of friction for a given downhole application and should not be limited.

In certain embodiments, the tread may further comprise additional additives. Additional additives may include, but are not limited to, a wear inhibitor, a corrosion inhibitor, a crosslinker, a tackifying agent, coatings, nanoparticulates, degradable metals, the like, or any combination thereof. Any additional additives may be included and should not be limited herein. Additional additives may be present in the tread in any amount and should not be limited.

The tread may be of any suitable thickness for a given application and should not be limited herein. Suitable tread thicknesses may include, but is not limited to, about 0.01 inches (about 0.2 mm) to about 1.0 inches (about 25 mm), or about 0.2 inches (about 5 mm) to about 0.5 inches (about 13 mm), or about 0.25 inches (about 6 mm) to about 0.7 inches (about 18 mm), and/or any value or range of values therein. The thickness of the tread should be selected so as to provide sufficient deflection for a given application. As used herein, deflection may refer to the radial displacement of the tread under compressive load. It may be advantageous to design the teeth of the tread to provide sufficient deflection for a given application so as to produce a contact area large enough to resist the compressive load.

The wheel may be formed in any suitable manner. In certain embodiments, the tread may be disposed on the outer surface of the substrate. Tread may be disposed on the outer surface of the substrate in any suitable manner and should not be limited herein. In certain embodiments, tread may be at least partially molded onto the outer surface of the substrate. Any molding technique capable of producing a wheel comprising an outer surface at least partially comprising a polymeric material may be used including, but not limited to, injection molding, compression molding, cast molding, the like, or any combination of molding techniques.

In certain embodiments, the molding process may be reversible. The tread may wear out as the wheel may be used. Once the tread of the wheel is worn out, the tread may be stripped off of the substrate. As used herein, "worn" may refer to tread in which cracks and/or voids may be formed on the point of contacts due to the cyclic loading. Point of contacts may refer to the point of the tread that may contact the wall of the tubular structure (e.g., casing, wellbore wall, the like, or any combination thereof). New tread may be molded onto the outer surface of the substrate thereby forming a "newly treaded" or "re-treaded" wheel. The newly treaded wheel may then be ready for use downhole. This process may be performed to at the well site or at a facility off-site. In certain embodiments, the stripped tread may be cleaned, recycled, and reused. The tread may be cleaned, recycled, and reused by a process located at the well site or at facilities located off-site. Any suitable process capable of cleaning, recycling, and reusing the tread may be used and should not be limited herein. Re-treading the wheels may be advantageous as it may reduce the replacement cost of the wheels.

The tread profile of the tread may be designed in such a way that the point of contact may have a minimum surface area so that the average contact stress due to a compression load may not exceed the yield strength of the material. Suitable tread profiles may include, but are not limited to, smooth, wavy, the like, and/or any combination thereof. In certain embodiments, the tread may comprise a wavy profile so as to increase the surface area for bonding at the tread-substrate interface. A wavy profile may also help ensure that the substrate and the tread are not separated when a wheel is under high traction load and high axial load. The profile of the tread may refer to the perpendicular The tread may include a plurality of teeth. The teeth may refer to a raised portion on the outer surface of the tread. The teeth of the tread may be designed to perform a wide variety of functions. In certain embodiments, the teeth may be designed to remove debris by utilizing the tangential and radial forces established between the wheel and the surrounding wellbore wall during operation of a downhole tractor system via rotation of the wheel. Additionally, the geometry of the teeth may be designed so as to counteract forces to which the wheel may be subject downhole. Such forces may include, but are not limited to, contact force, axial force, traction force, the like, and/or any combination thereof. In certain embodiments, the teeth may frictionally engage a wellbore wall which may provide a compressive load between the wellbore wall and the teeth. In a non-limiting example, the compressive stress produced by contact force may be minimized by designing the teeth to have a large load area.

The geometry of each of the teeth may include, but is not limited to, cubes, rectangular blocks, cylindrical halves, spherical halves, the like, or any combination thereof. Teeth may extend radially outward from the outer surface of the substrate or a portion of tread covering the substrate. In certain embodiments, each one of the teeth may be solid or hollow. The teeth may be distributed about the circumference of the wheel thereby creating a tread pattern. In certain embodiments, the teeth may be arranged across the width of the wheel and/or along the length or the circumference of the wheel thereby creating a tread pattern. Any suitable tread pattern may be used and should not be limited herein. In certain embodiments, the teeth of each wheel may be oriented in a non-parallel relationship with a rotational axis of the wheel. In certain embodiments, the teeth of each wheel may be oriented in a parallel relationship with a rotational axis of the wheel.

In certain embodiments, a downhole tool may be coupled to a downhole tractor. The downhole tractor may comprise a wheel assembly. A wireline may be coupled to the downhole tractor. The downhole tractor may be powered thereby providing energy to the wheel assembly. The wheel assembly may then be rotated. The rotating wheels may establish a contact force between the wheel assembly and the wellbore wall. In certain embodiments, the rotating wheels may establish contact force with a casing, a tubing string, a liner, pipe, the like, and/or any combination. In certain embodiments, the wellbore wall, casing, tubing string, line, pipe, and/or the like, may be treated with a coating. Any suitable coating may be used and should not be limited herein. The downhole tractor may then move along the wellbore wall until the downhole tractor may reach a desired location downhole. Once the downhole tractor reaches the desired location, the downhole tractor may be stopped. In certain embodiments, power to the wheel assembly may be removed. The downhole tool may then be deployed or used. Once the downhole tool has performed its desired function or operation, the downhole tractor may be powered on. The downhole tractor may then be removed from the wellbore. After each use, the condition of the tread may be observed. This process may be repeated a number of times, at the same well site or at different well sites, until it may be observed that the tread of the wheels may be worn out. The tread of the wheels may then be removed from the substrate. The tread may be removed from the substrate in any suitable manner and should not be limited herein. In certain embodiments, the tread may be stripped from the substrate. In certain embodiments, new tread may be disposed onto the substrate thereby creating another or a "new" wheel. The new wheel may be disposed on the downhole tractor and deployed for use in an operation. The method presented above may be repeated any number of times.

In certain embodiments, the worn out tread may be further processed after removal. Further processing may include, but is not limited to, cleaning, recycling, reusing, the like, and/or any combination thereof. Any suitable process capable of further processing the worn out tread may be used and should not be limited herein. In certain embodiments, the worn out tread may be further processed at a wellsite or at an off-site location.

Methods and systems of using the wheel described herein may now be described in more detail with reference to the figures. FIG. 1 illustrates downhole system 100. In certain embodiments, drilling fluids may directly or indirectly affect one or more components or pieces of equipment associated with downhole system 100, according to one or more embodiments. It should be noted that while FIG. 1 generally depicts a land-based system, those skilled in the art will readily recognize that the principles described herein are equally applicable to subsea systems that employ floating or sea-based platforms and rigs, without departing from the scope of the disclosure.

FIG. 1 illustrates an example downhole system 100 comprising a downhole tractor 114. In certain embodiments, downhole tractor 114 may be coupled to a length of wireline 116 and disposed in a wellbore 102. The illustrated wellbore 102 is a deviated wellbore that is formed to extend from a terranean surface 104 to a subterranean zone 106 (e.g., a hydrocarbon bearing geologic formation) and includes a vertical portion 108, a radius portion 110, and a horizontal portion 112. Although portions 108 and 112 are referred to as "vertical" and "horizontal," respectively, it should be appreciated that such wellbore portions may not be exactly vertical or horizontal, but instead may be substantially vertical or horizontal to account for drilling operations. Further, the wellbore 102 may be a cased well, a working string, or an open hole, and is of such length that it is shown broken.

The illustrated downhole system 100 may include a wireline 116 extending from the terranean surface 104 to downhole tractor 114. Electrical power and control signals to and from the downhole tractor 114 are transmitted via the wireline 116, which includes, for example, a single-strand or multi-strand conductor 118 that is run through the wireline 116 downhole to the downhole tractor 114. In some embodiments, the wireline 116 may be an electrical cable to lower tools (e.g., the downhole tractor 114 and/or other downhole tool) into the wellbore 102 and to facilitate the transmission of power and data. The wireline 116, in some embodiments, may be a conductor for electric logging and cables incorporating electrical conductors. In certain embodiments, data may be transmitted to information handling system 140 for storage and further processing.

In certain embodiments, the present disclosure may be implemented at least in part with an information handling system 140. For purposes of this disclosure, an information handling system 140 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system 140 may be a personal computer, a network storage device, or any other suitable device and may vary in size, shape, performance, functionality, and price. The information handling system 140 may include random access memory (RAM), one or more processing resources such as a central processing unit (CPU) or hardware or software control logic, ROM, and/or other types of nonvolatile memory. Additional components of the information handling system 140 may include one or more disk drives, one or more network ports for communication with external devices as well as various input and output (I/O) devices, such as a keyboard, a mouse, and a video display. The information handling system 140 may also include one or more buses operable to transmit communications between the various hardware components.

In certain embodiments, the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Electrical and hydraulic power subs may also be included in the downhole tractor 114 and may deliver electrical and hydraulic power to various portions of the downhole tractor 114. A lower coupling sub of the downhole tractor 114, as illustrated, is coupled to a downhole tool 120, which may be, for example, a shifting tool, a logging tool, an explosive tool (e.g., a perforating gun or otherwise), a packer, or other type of downhole tool, or other payload.

In certain embodiments, downhole tractor 114 may comprise a tubular housing that may be subdivided into various subs, at least one of which includes one or more wheels 122 and another that is a coupling sub to connect to the wireline 116. In certain embodiments, a downhole tool 120 may be coupled to the tubular housing. Any suitable downhole tool 120 may be coupled to the tubular housing and should not be limited herein. Suitable downhole tools 120 may include, but are not limited to, a shifting tool, an explosive tool, a logging tool, a packer, the like, and/or any combination thereof. Although the term "wheel" is used herein, the present disclosure contemplates that other rolling members, such as tracks, roller bearings, or otherwise, may also be employed in lieu of or in addition to any illustrated wheels 122. Although three wheels 122 are illustrated in FIG. 1, the downhole tractor 114 may include any suitable number of wheels 122 and should not be limited herein. One or more wheels 122 may be powered wheel assemblies for propelling the downhole tractor 114 through the wellbore 102 in order to run the wireline 116 into the wellbore 102. Other wheels 122 or wheel assemblies of the downhole tractor 114 may not be powered but instead be freely rotatable in contact with the wellbore 102 (or casing as appropriate) during operation of the downhole tractor 114. In certain embodiments, wheels 122 may be secured to the downhole tractor 114 and should not be limited herein.

Figure 2A:
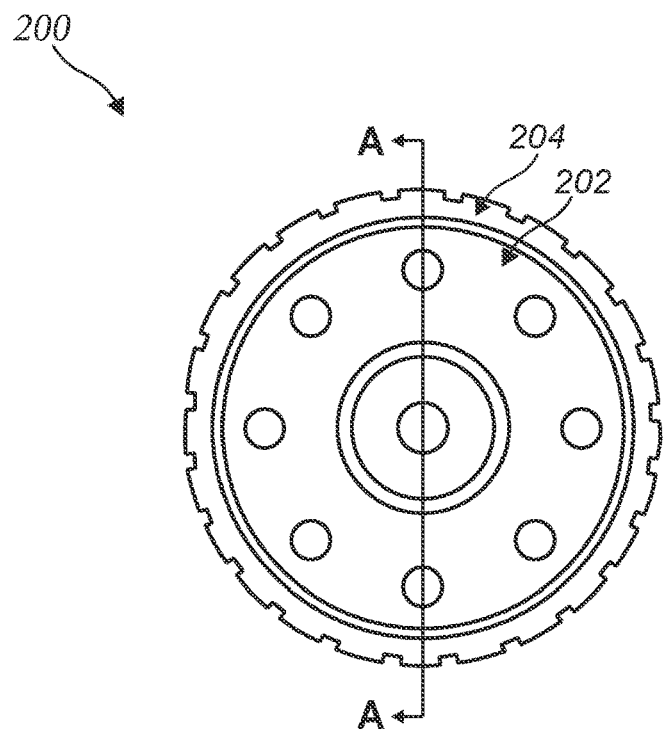
FIGS. 2a and 2b illustrate an embodiment of wheel.
Figure 2B:
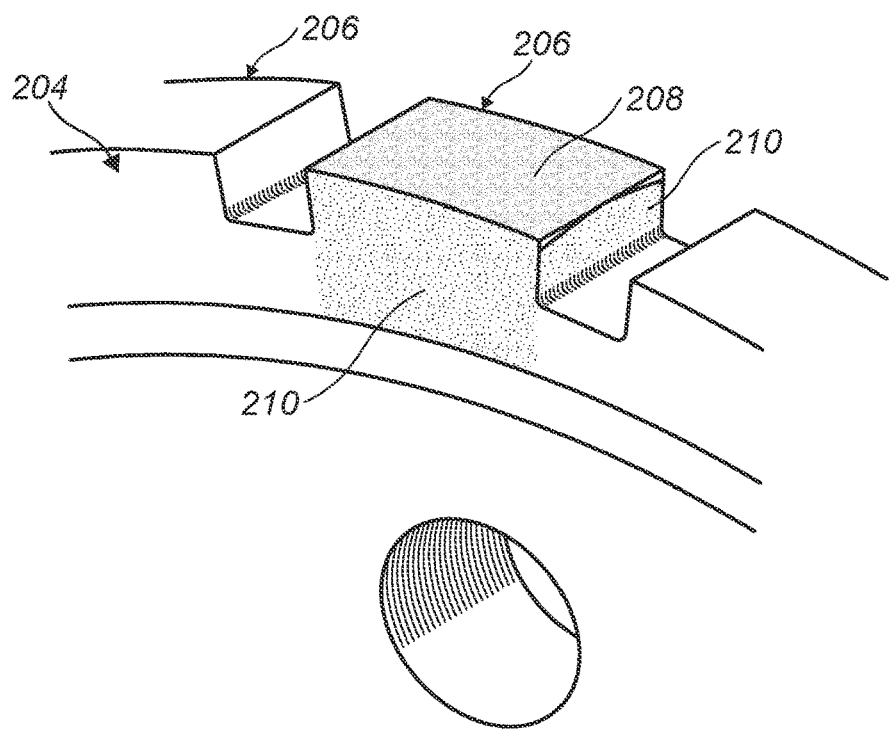

FIGS. 2a and 2b illustrate an embodiment of wheel 200. Wheel 200 may comprise a substrate 202 and a tread 204. In certain embodiments, an inner surface of tread (not shown) may be disposed on an outer surface of substrate (not shown). Tread 204 may comprise a plurality of teeth 206 disposed about the circumference and width of wheel 200. In certain embodiments, a plurality of teeth may span the width of wheel 200. Optionally, a single tooth may span the width of wheel 200, as depicted in FIG. 2b. Each one of the teeth 206 is defined by its shape factor. As used herein, the "shape factor" of an individual tooth is the ratio of the surface area of the horizontal load surface to the surface area of the vertical exposed side surfaces of the tooth and is between 0.5 to 2.0. Teeth 206 may have any suitable shape factor and should not be limited herein. Suitable shape factors may include, but are not limited to, 0.5 to 2.0, or 0.5 to 1.0, or 1.0 to 2.0, and/or any value or range of values therein. Teeth 206 may have any suitable shape factor for a given application and should not be limited herein.

The shape factor may be used to describe the geometric effects on the compression modulus. In certain embodiments, shape factor may be proportionally related to the compression modulus of the tread. In certain embodiments, for a given load, a higher shape factor may result in a higher compression modulus and thereby may result in a smaller deflection. As such, to minimize damage to the wellbore or tubular walls, it may be advantageous for the tread to comprise teeth with a higher shape factor which may minimize damage to the wellbore and/or tubular walls. The teeth in a tread pattern may have the same shape factor. In certain embodiments, the teeth in a tread pattern may have different shape factors.

FIGS. 3a and 4a depict a front view of a wheel 300, 400 in which the view is perpendicular to an axis about which the wheel 300, 400 rotates. Wheel 300, 400 comprises an outer surface of tread 302, 402, an inner surface of tread 304, 404, an outer surface of substrate 306, 406, and an inner surface of substrate 308, 408. In certain embodiments, wheel 300, 400 may comprise an outer profile 310, 410 about the circumference of wheel 300, 400 at the interface of the inner surface of tread 304 and the outer surface of substrate 306. In certain embodiments, outer profile 310 may be a smooth profile, as illustrated in FIG. 3a. In certain embodiments, outer profile 410 may be a non-smooth profile, as illustrated in FIG. 4a. While FIG. 4a depicts a non-smooth profile comprising ridges and valleys, it should be noted that any non-smooth profile capable of increasing the surface area at the circumferential interface between the inner surface of tread 404 and the outer surface of substrate 406 may be used. This may be advantageous as increasing the surface area at the circumferential interface between the inner surface of tread 404 and the outer surface of substrate 406 may aid in bonding at the circumferential interface.

FIGS. 3b and 4b depict a cross-sectional view of wheel 300, 400 taken at A-A. In certain embodiments, wheel 300, 400 may comprise an outer surface of tread 302, 402, an inner surface of tread 304, 404, an outer surface of substrate 306, 406, and an inner surface of substrate 308, 408. Wheel 300, 400 may further comprise an inner profile 312, 412 spanning the depth of wheel 300, 400 at the interface between the inner surface of tread 304, 404 and the outer surface of substrate 306, 406. In certain embodiments, inner profile 312 may be a non-smooth profile comprising ridges and valleys. While FIG. 3b depicts a non-smooth inner profile 312 comprising ridges and valleys, it should be noted that any non-smooth profile capable of increasing the surface area along the depth of wheel 300 at the interface between the inner surface of tread 304 and outer surface of substrate 306. This may be advantageous as increasing the surface area at the interface may aid in bonding at the interface. In certain embodiments, inner profile 412 may be a smooth profile as shown in FIG. 4b. Any combination of outer profiles 310, 410 and inner profiles 312, 412 may be used and should not be limited.

Accordingly, this disclosure describes methods, systems, and apparatuses that may use the disclosed wheels. The methods, systems, and apparatuses may include any of the following statements:

Statement 1. A downhole tractor system comprising: a tubular housing capable of being deployed downhole by a wireline; a plurality of wheels rotatably mounted to the tubular housing, the wheels having at least a portion of an outer surface comprising a polymeric material.

Statement 2. The system of statement 1, wherein the wheel further comprises a substrate and tread comprising the polymeric material.

Statement 3. The system of statement 1 or 2, wherein the tread comprises a plurality of teeth distributed about a circumference of the wheel thereby creating a tread pattern.

Statement 4. The system of any of statements 1 to 3, wherein the plurality of teeth are distributed about the width of the outer surface of the wheel.

Statement 5. The system of any of statements 1 to 4, wherein the teeth frictionally engage an inner wall of a wellbore thereby providing a compressive load between a wall of the wellbore and the teeth.

Statement 6. The system of any of statements 1 to 5, wherein each of the teeth comprises a shape factor of about 0.5 to about 2.0 thereby providing a contact area capable of minimizing the compressive load.

Statement 7. The system of any of statements 1 to 6, wherein about 0.001% or less of a surface area of an inner wall of a wellbore is damaged by the wheel.

Statement 8. The system of any of statements 1 to 7, wherein the polymeric material comprises an operating temperature of about 2° C. to about 177° C., wherein the polymeric material comprises an ultimate tensile strength of about 27,600 kPa or greater, wherein the polymeric material comprises an ultimate elongation of about 150% to about 450%, wherein the polymeric material comprises a compression set of about 0.0001% to about 10%, wherein the polymeric material comprises a shore A hardness of about 90 to about 95, and wherein the polymeric material comprises a coefficient of friction of about 0.3 to about 0.9.

Statement 9. The system of any of statements 1 to 8, wherein the tread is molded onto the substrate by at least one technique selected from the group consisting of injection molding, compression molding, cast molding, or any combinations thereof.

Statement 10. The system of any of statements 1 to 9, wherein an outer profile about the circumference of each wheel comprises a non-smooth profile or a smooth profile, wherein an inner profile spanning a depth of each wheel comprises a non-smooth profile or a smooth profile.

Statement 11. A method for conveying a downhole tool along an inner wall of a wellbore, the method comprising: disposing the downhole tool coupled to a downhole tractor within the wellbore; providing energy to the downhole tractor by way of a wireline thereby rotating a wheel disposed on the downhole tractor; frictionally engaging the inner wall of the wellbore with a wheel comprising a polymeric material disposed on at least a portion of an outer surface of the wheel thereby providing a compressive load between the inner wall of the wellbore and the polymeric material; allowing the downhole tractor to proceed along the wellbore wall until the downhole tractor reaches a desired location; deploying the downhole tool for use in the wellbore.

Statement 12. The method of statement 11, further comprising: removing the downhole tractor from the wellbore; and observing a physical condition of the polymeric material.

Statement 13. The method of statement 11 or 12, further comprising determining the physical condition of the polymeric material is suitable for frictionally engaging the inner wall of the wellbore and repeating the method at least one time.

Statement 14. The method of any of statements 11 to 13, further comprising: determining the physical condition of the polymeric material is no longer suitable for frictionally engaging the inner wall of the wellbore; removing the polymeric material from the wheel thereby separating the polymeric material from a substrate; molding a new polymeric material on the substrate thereby creating a new wheel; coupling the new wheel to the downhole tractor; and repeating the method at least one time.

Statement 15. The method of any of statements 11 to 14, further comprising cleaning, recycling, and reusing the removed polymeric material.

Statement 16. The method of any of statements 11 to 15, further comprising minimizing the compressive load between the inner wall of the wellbore wall and the polymeric material by way of a plurality of teeth distributed about the circumference of the wheel.

Statement 17. The method of any of statements 11 to 16, wherein each one of the teeth comprises a shape factor of about 0.5 to about 2.0 thereby adjusting deflection of the polymeric material based on the shape factor.

Statement 18. The method of any of statements 11 to 17, wherein the plurality of teeth are distributed about the full width of the outer surface of the wheel.

Statement 19. The method of any of statements 11 to 18, wherein a plurality of wheels are rotatably mounted to the downhole tractor.

Statement 20. The method of any of statements 11 to 19, wherein the polymeric material comprises an operating temperature of about 2° C. to about 177° C., wherein the polymeric material comprises an ultimate tensile strength of about 27,600 kPa or greater, wherein the polymeric material comprises an ultimate elongation of about 150% to about 450%, wherein the polymeric material comprises a compression set of about 0.0001% to about 10%, wherein the polymeric material comprises a shore A hardness of about 90 to about 95, and wherein the polymeric material comprises a coefficient of friction of about 0.3 to about 0.9.

It should be understood that the compositions and methods are described in terms of "comprising," "containing," or "including" various components or steps, and the compositions and methods may also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited. in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A downhole tractor system comprising:
   a tubular housing capable of being deployed downhole by a wireline;
   a plurality of wheels rotatably mounted to the tubular housing, the wheels having at least a portion of an outer surface comprising a polymeric material, wherein each of the wheels further comprise a substrate and tread comprising the polymeric material, wherein the tread comprises a plurality of teeth distributed about a circumference of the wheel thereby creating a tread pattern, wherein an outer profile about the circumference of each substrate comprises a non-smooth profile of alternating ascending sloping ridges and descending sloping valleys, wherein an inner profile spanning a depth of each tread comprises a non-smooth profile corresponding to the outer profile of each substrate; wherein the teeth frictionally engage an inner wall of a wellbore thereby providing a compressive load between a wall of the wellbore and the teeth, wherein each of the teeth comprises a shape factor of between 0.5 to 2.0, thereby providing a contact area capable of minimizing the compressive load; wherein the shape factor of a tooth is measured in an an uncompressed state.

2. The system of claim 1, wherein the plurality of teeth are distributed about the width of the outer surface of the wheel.

3. The system of claim 1, wherein the polymeric material comprises an operating temperature of 2° C. to 177° C., wherein the polymeric material comprises an ultimate tensile strength of 27,600 kPa or greater, wherein the polymeric material comprises an ultimate elongation of 150% to 450%, wherein the polymeric material comprises a compression set of 0.0001% to 10%, wherein the polymeric material comprises a shore A hardness of 90 to 95, and wherein the polymeric material comprises a coefficient of friction of 0.3 to 0.9.

4. The system of claim 1, wherein the tread is molded onto the substrate by at least one technique selected from the group consisting of injection molding, compression molding, cast molding, or any combinations thereof.

5. The system of claim 1, wherein the tread further comprises an additive selected from the group consisting of a wear inhibitor, a corrosion inhibitor, a crosslinker, a tackifying agent, coatings, nanoparticulates, degradable metals, and any combination thereof.

6. The system of claim 1, wherein the polymeric material is selected from the group consisting of a polyurethane rubber, cast polyurethanes, thermoplastic polyurethanes, polyethane polyurethanes, a polyester-based polyurethane rubber, lactone polyester-based thermoplastic polyurethanes, a polyether-based polyurethane rubber, a thiol-based polymer, 1,3,5,-triacryloylhexahydro-1,3,5-triazine), a thiol-epoxy polymer, having an epoxide functional group, triglycidylisocyanurate, trimethylolpropane triglycidyl ether, a hyaluronic acid rubber a polyhydroxobutyrate rubber, a polyester elastomer, a polyester amide elastomer, a starch-based resin, starch-poly (ethylene-co-vinyl alcohol), a starch-polyvinyl alcohol, a starch-polylactic acid, starch-polycaprolactone, starch-poly(butylene succinate), a polyethylene terephtha late polymer, a polyester thermoplastic, polyether/ester copolymers, polyester/ester copolymers, a polylactic acid polymer, a polybutylene succinate polymer, a polyhydroxy alkanoic acid polymer, a polybutylene terephthalate polymer, a polysaccharide, chitin, chitosan, a protein; an aliphatic polyester, poly(ε-caprolactone), a poly (hydroxybutyrate), poly(ethyleneoxide), poly(phenyllactide), a poly(amino acid), a poly(orthoester), polyphosphazene, a polylactide, a polyglycolide, a poly(anhydride), poly(adipic anhydride), poly(suberic anhydride), poly(sebacic anhydride), poly(dodecanedioic anhydride), poly(maleic anhydride), and poly(benzoic anhydride), a polyepichlorohydrin, a copolymer of ethylene oxide/polyepichlorohydrin, a terpolymer of epichlorohydrin/ethylene oxide/allyl glycidyl ether, nitrile butadiene (NBR), acrylonitrile, organosiloxoane elastomer, butadiene, carboxylated acrylonitrile butadiene (XNBR), hydrogenated acrylonitrile butadiene (HNBR), carboxylated hydrogenated acrylonitrile butadiene (XHNBR), hydrogenated carboxylated acrylonitrile butadiene (HXNBR), ethylene propylene (EPR), ethylene propylene diene (EPDM), tetrafluoroethylene and propylene (FEPM), fluorocarbon (FKM), perfluoroelastomer (FEKM), polphenylene sulfide (PPS), polyetheretherketones, polytetrafluoroethylene (PTFE), copolymers thereof, terpolymers thereof, derivatives thereof, and any combinations thereof.

7. A method for conveying a downhole tool along an inner wall of a wellbore, the method comprising:
disposing the downhole tool coupled to a downhole tractor within the wellbore;
providing energy to the downhole tractor by way of a wireline thereby rotating a wheel disposed on the downhole tractor;
frictionally engaging the inner wall of the wellbore with a wheel comprising a polymeric material disposed on at least a portion of an outer surface of the wheel thereby providing a compressive load between the inner wall of the wellbore and the polymeric material, wherein each of the wheels further comprise a substrate and tread comprising the polymeric material, wherein the tread comprises a plurality of teeth distributed about a circumference of the wheel thereby creating a tread pattern, wherein an outer profile about the circumference of each substrate comprises a non-smooth profile of alternating ascending sloping ridges and descending sloping valleys, wherein an inner profile spanning a depth of each tread comprises a non-smooth profile corresponding to the outer profile of each substrate; wherein each of the teeth comprises a shape factor of between 0.5 to 2.0, thereby providing a contact area capable of minimizing the compressive load; wherein the shape factor of a tooth is measured in an uncompressed state;
allowing the downhole tractor to proceed along the wellbore wall until the downhole tractor reaches a desired location;
deploying the downhole tool for use in the wellbore.

8. The method of claim 7, further comprising:
removing the downhole tractor from the wellbore; and
observing a physical condition of the polymeric material.

9. The method of claim 8, further comprising determining the physical condition of the polymeric material is suitable for frictionally engaging the inner wall of the wellbore and repeating the method at least one time.

10. The method of claim 8, further comprising:
determining the physical condition of the polymeric material is no longer suitable for frictionally engaging the inner wall of the wellbore;
removing the polymeric material from the wheel thereby separating the polymeric material from a substrate;
molding a new polymeric material on the substrate thereby creating a new wheel;
coupling the new wheel to the downhole tractor; and
repeating the method at least one time.

11. The method of claim 10, further comprising cleaning, recycling, and reusing the removed polymeric material.

12. The method of claim 7, wherein the plurality of teeth are distributed about the full width of the outer surface of the wheel.

13. The method of claim 7, wherein a plurality of wheels are rotatably mounted to the downhole tractor.

14. The method of claim 13, wherein the polymeric material comprises an operating temperature of 2° C. to 177° C., wherein the polymeric material comprises an ultimate tensile strength of 27,600 kPa or greater, wherein the polymeric material comprises an ultimate elongation of 150% to 450%, wherein the polymeric material comprises a compression set of 0.0001% to 10%, wherein the polymeric material comprises a shore A hardness of 90 to 95, and wherein the polymeric material comprises a coefficient of friction of 0.3 to 0.9.

15. The method of claim 7, wherein the tread is molded onto the substrate by at least one technique selected from the group consisting of injection molding, compression molding, cast molding, or any combinations thereof.

16. The method of claim 7, wherein the tread further comprises an additive selected from the group consisting of a wear inhibitor, a corrosion inhibitor, a crosslinker, a tackifying agent, coatings, nanoparticulates, degradable metals, and any combination thereof.

* * * * *

UNITED STATES PATENT AND TRADEMARK OFFICE
CERTIFICATE OF CORRECTION

PATENT NO. : 12,352,120 B2
APPLICATION NO. : 17/628530
DATED : July 8, 2025
INVENTOR(S) : Simon Whye Kwong Wai and Wesley Neil Ludwig Page 1 of 1

It is certified that error appears in the above-identified patent and that said Letters Patent is hereby corrected as shown below:

In the Claims

At Column 12, in Claim 1, Line 35, delete the duplicate "an"

Signed and Sealed this
Fourteenth Day of October, 2025

John A. Squires
*Director of the United States Patent and Trademark Office*